United States Patent
Miyanaga

(10) Patent No.: US 10,132,344 B2
(45) Date of Patent: Nov. 20, 2018

(54) ANCHOR BOLT

(71) Applicant: KABUSHIKI KAISHA MIYANAGA, Miki-shi, Hyogo (JP)

(72) Inventor: Masaaki Miyanaga, Miki (JP)

(73) Assignee: KABUSHIKI KAISHA MIYANAGA, Miki-shi, Hyogo (JP)

( * ) Notice: Subject to any disclaimer, the term of this patent is extended or adjusted under 35 U.S.C. 154(b) by 142 days.

(21) Appl. No.: 15/394,434

(22) Filed: Dec. 29, 2016

(65) Prior Publication Data

US 2018/0187709 A1 Jul. 5, 2018

(51) Int. Cl.
*F16B 13/06* (2006.01)
*F16B 13/08* (2006.01)

(52) U.S. Cl.
CPC .......... *F16B 13/06* (2013.01); *F16B 13/0833* (2013.01)

(58) Field of Classification Search
CPC ...... F16B 13/004; F16B 13/06; F16B 13/065; F16B 13/066; F16B 13/0833; F16B 13/0841; F16B 13/0858
USPC .................... 411/44, 54.1, 57.1, 60.1, 71–72
See application file for complete search history.

(56) References Cited

U.S. PATENT DOCUMENTS

| | | | | |
|---|---|---|---|---|
| 1,619,757 A * | 3/1927 | Pelkey | ....................... | E01B 9/14 238/290 |
| 2,373,585 A * | 4/1945 | Mancini | ................ | F16B 13/066 411/52 |
| 4,702,654 A * | 10/1987 | Frischmann | .......... | F16B 13/004 411/31 |
| 4,906,148 A * | 3/1990 | Schule | .................. | E04D 3/3603 411/34 |
| 4,968,200 A * | 11/1990 | Mark | ..................... | F16B 13/065 411/55 |
| 6,027,292 A * | 2/2000 | Raber | ................... | F16B 13/065 411/60.1 |
| 6,132,152 A * | 10/2000 | Kaibach | .............. | F16B 13/0858 411/30 |
| 6,712,572 B2 * | 3/2004 | Bisping | ............... | F16B 13/0825 411/60.1 |
| 2004/0253075 A1 * | 12/2004 | Liebig | .................. | F16B 13/066 411/57.1 |

(Continued)

FOREIGN PATENT DOCUMENTS

| JP | H5-17214 U | 3/1993 |
|---|---|---|
| JP | 2004-225890 A | 8/2004 |

(Continued)

*Primary Examiner* — Roberta S Delisle
(74) *Attorney, Agent, or Firm* — Marshall, Gerstein & Borun LLP

(57) ABSTRACT

An anchor bolt inserted in a mounting hole includes: a shaft including an expanded diameter portion formed on its distal end, the expanded diameter portion having a tapered outer peripheral surface; a sleeve, into which the shaft is inserted from the proximal end side of the shaft, such that the sleeve covers an outer peripheral surface of the shaft, the sleeve including an expandable portion, which is configured to bend outwardly along the expanded diameter portion when pushed from an insertion complete state of the shaft; and a fitting piece connecting the shaft and the sleeve. A first recessed groove is formed in a peripheral surface of the sleeve. A ring, which contacts an inner peripheral wall of the mounting hole, is fitted in the first recessed groove.

8 Claims, 10 Drawing Sheets

(56) References Cited

U.S. PATENT DOCUMENTS

2009/0274534 A1* 11/2009 Zimmer ................ F16B 13/063
                                                                                    411/57.1
2012/0311947 A1* 12/2012 Van Wissen .......... F16B 13/066
                                                                                     52/250

FOREIGN PATENT DOCUMENTS

| JP | 2009-257304 A | 11/2009 |
| JP | 2009-540157 A | 11/2009 |
| WO | WO-2007/145753 A2 | 12/2007 |

* cited by examiner

ANCHOR BOLT

BACKGROUND OF THE INVENTION

Field of the Invention

The present invention relates to an anchor bolt to be fixed in a mounting hole formed in a concrete wall or the like.

Description of the Related Art

In order to mount some component, structure, or the like on a concrete wall or the like, the following technique is widely used: fix an anchor bolt in a mounting hole formed in the concrete wall surface; and fit the component, structure, or the like to the anchor bolt. The mounting hole includes a thin hole portion and an expanded diameter hole portion. The thin hole portion is open at the wall surface, and the expanded diameter hole portion is formed at the back of the thin hole portion. The anchor bolt has an elongated shape, and includes a shaft. The shaft includes an expanded diameter portion formed on its distal end and a bolt formed on its proximal end. The outer peripheral surface of the expanded diameter portion is tapered such that its shape corresponds to the shape of the expanded diameter hole portion (see Japanese Laid-Open Utility Model Application Publication No. H05-017214). A sleeve is fitted to the outside of the shaft in a frictionally slidable manner. The distal end portion of the sleeve is configured to bend outwardly along the expanded diameter portion of the shaft. The diameter of the thin hole portion is substantially the same as the diameter of the expanded diameter portion of the anchor bolt and the external diameter of the sleeve.

In order to fix the anchor bolt in the mounting hole, the expanded diameter portion is inserted into the hole with the sleeve pulled such that the sleeve is away from the expanded diameter portion. When the expanded diameter portion has reached the expanded diameter hole portion, the sleeve is driven into the concrete wall or the like. The distal end portion of the sleeve moves into the expanded diameter hole portion while bending outwardly along the expanded diameter portion, thereby filling the gap between the expanded diameter portion and the expanded diameter hole portion. As a result, the anchor bolt is fixed in the mounting hole. Some component, structure, or the like is fitted through the bolt of the anchor bolt, and then a nut is fitted to the bolt and rotated thereon. In this manner, the component, structure, or the like can be mounted on the concrete wall or the like.

The outer peripheral surface of the sleeve fitted to the shaft of the anchor bolt is in contact with the inner peripheral surface of the mounting hole. The shaft and the sleeve are frictionally in contact with each other, and the sleeve is fixed to the inner peripheral surface of the mounting hole. Accordingly, when the nut fitted to the bolt of the shaft is rotated, the shaft and the sleeve do not rotate, which allows the nut to be screwed on the bolt smoothly.

However, the friction force between the outer peripheral surface of the sleeve and the inner peripheral surface of the mounting hole varies due to, for example, variation in the internal diameter of the inner peripheral surface of the mounting hole. Therefore, there is a case where when the nut is fitted to the bolt and rotated thereon, the sleeve in contact with the shaft rotates, i.e., the shaft and the sleeve rotate together inside the mounting hole when the nut is rotated, and as a result, the nut cannot be tightened sufficiently. In this case, the nut is rotated while preventing the rotation of the shaft by holding the distal end of the bolt with a wrench. In this case, however, it is necessary to rotate the nut with one hand, and hold the wrench with the other hand, which is troublesome work.

In view of the above, an object of the present invention is to provide an anchor bolt capable of preventing the shaft and the sleeve from rotating together with the nut when the nut is fitted to the bolt and rotated thereon.

SUMMARY OF THE INVENTION

The present invention is an anchor bolt to be inserted in a mounting hole formed in a wall surface. The anchor bolt includes: a shaft elongated and extending along its axis, the shaft including an expanded diameter portion formed on its distal end and a bolt formed on its proximal end, the expanded diameter portion having a tapered outer peripheral surface that expands outwardly when seen in an insertion direction into the mounting hole; and a hollow sleeve that covers and is in contact with an outer peripheral surface of the shaft, the sleeve including an expandable portion formed at its distal end, the expandable portion being configured to bend outwardly to be in an expanded state. A state where the sleeve covers the shaft such that the expandable portion is in an unexpanded state is a first state of the shaft and the sleeve. When the sleeve is further pushed into the mounting hole in the insertion direction from a state where the shaft and the sleeve in the first state are inserted in the mounting hole such that the distal end of the shaft is in contact with a bottom of the mounting hole, the expandable portion bends outwardly along the expanded diameter portion to be in the expanded state. A first recessed groove is formed in an outer peripheral surface of the sleeve. A ring that comes into contact with an inner peripheral wall of the mounting hole is fitted in the first recessed groove.

A through-hole that allows the first recessed groove and a hollow portion of the sleeve to be in communication with each other is formed in the sleeve. A second recessed groove is formed in the outer peripheral surface of the shaft at a position that corresponds to a position of the through-hole in the first state. A fitting piece is formed on the ring, the fitting piece extending such that the fitting piece passes through the through-hole to reach the second recessed groove in the first state. The fitting piece serves as a connector that connects the shaft and the sleeve in the first state.

Since the ring fitted in the first recessed groove comes into contact with the inner peripheral wall of the mounting hole, by inserting the sleeve into the mounting hole in a state where the shaft is inserted in the sleeve, rotation of the sleeve is prevented by the friction force exerted between the ring and the inner peripheral wall. Even if the sleeve is further pushed in the insertion direction from the state where the distal end of the shaft is in contact with the bottom of the mounting hole, the shaft is still fixed to the sleeve in the rotation direction since the shaft and the sleeve are frictionally in contact with each other.

That is, the ring prevents the sleeve from rotating relative to the mounting hole, and the friction prevents the shaft and the sleeve from rotating relative to each other. This makes it possible to prevent the shaft and the sleeve from rotating together with a nut when the nut is fitted to the shaft and rotated thereon.

In the state where the sleeve covers the shaft, the sleeve and the shaft are connected together by the fitting piece of the ring made of an elastic material. In this connected state, the sleeve is further pushed in the insertion direction, and thereby the ring fitted in the first recessed groove is also pushed in together with the sleeve. Part of the fitting piece is removed from the second recessed groove and moves onto the outer peripheral surface of the shaft. The fitting piece that has moved onto the outer peripheral surface of the shaft is partly sandwiched and deformed between the outer peripheral surface of the sleeve and the inner peripheral wall of the mounting hole. Here, the ring is sandwiched and held between the inner peripheral wall of the mounting hole and the outer peripheral surface of the shaft, i.e., in a tension rod-like state. As a result, rotation of the sleeve relative to the mounting hole and rotation of the shaft are prevented. This makes it possible to prevent the shaft and the sleeve from rotating together with a nut when the nut is fitted to the shaft and rotated thereon.

DESCRIPTION OF THE PREFERRED EMBODIMENTS

Embodiment 1

Figure 1:
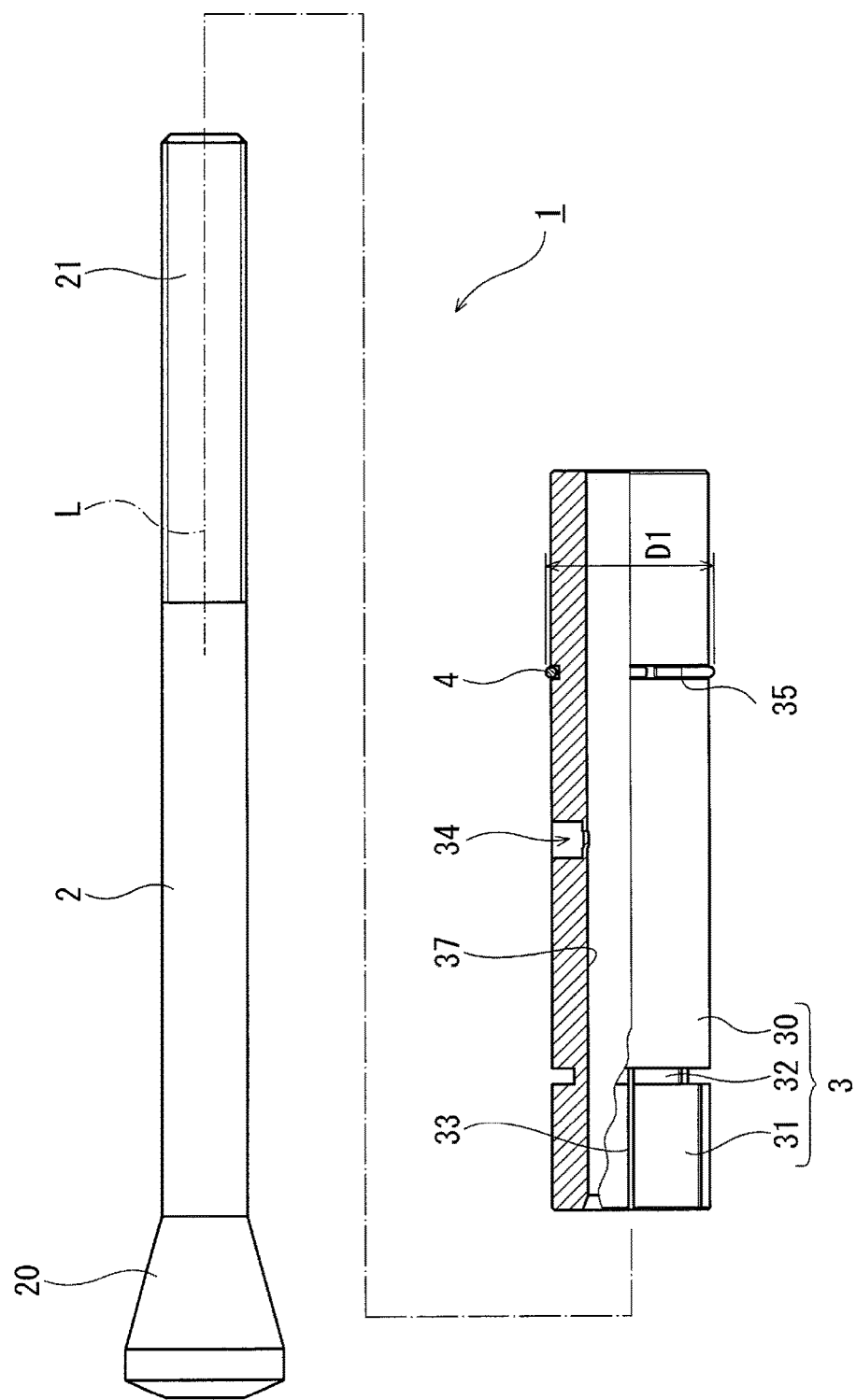
FIG. 1 is a partially cutaway sectional view of an anchor bolt according to one embodiment.

Hereinafter, an anchor bolt according to one embodiment of the present invention is described with reference to the drawings. In the drawings, the same or corresponding elements are denoted by the same reference signs, and repeating the same descriptions is avoided below.

FIG. 1 is a partially cutaway sectional view of an anchor bolt 1 according to the present embodiment. Similar to the anchor bolt described above in Description of the Related Art, the anchor bolt 1 is to be fixed in a mounting hole drilled in a concrete wall surface. The anchor bolt 1 includes a shaft 2 and a hollow sleeve 3. The shaft 2 is elongated and extends along its axis L. The shaft 2 includes an expanded diameter portion 20 formed on its distal end and a bolt 21 formed on its proximal end. The shaft 2 is inserted into the hollow sleeve 3 from the proximal end side, i.e., the bolt 21 side, of the shaft 2, such that the hollow sleeve 3 covers and is in contact with the outer peripheral surface of the shaft 2. The hollow sleeve 3 includes expandable portions 31 provided at its distal end. The expandable portions 31 are configured to bend outwardly along the expanded diameter portion 20, i.e., configured to be in an expanded state.

The shaft 2 and the sleeve 3 are both made of metal. The internal diameter of a hollow portion 37 of the sleeve 3 is substantially equal to the diameter of the shaft 2. The expanded diameter portion 20 has a tapered outer peripheral surface that expands outwardly when seen in an insertion direction into the mounting hole. The maximum diameter of the expanded diameter portion 20 is substantially equal to the external diameter of the sleeve 3.

The expandable portions 31 are provided on the distal end of a sleeve body 30 of the sleeve 3 via a thin-wall connecting portion 32, such that the expandable portions 31 are arranged in a circumferential direction. Adjoining expandable portions 31 are spaced apart from each other by a slit 33, which extends along the axis L.

A recess 34 is formed in the outer peripheral surface of the sleeve 3. By hitting the bottom of the recess 34 to the inside in a state where the shaft 2 is inserted in the sleeve 3, plastic deformation of the bottom of the recess 34 occurs such that it bites into the peripheral surface of the shaft 2 (see FIG. 4). As a result, the sleeve 3 and the shaft 2 are connected together, which allows them to rotate integrally about the axis L. That is, the bottom of the recess 34 serves as the "connector" of the present invention. When the sleeve 3 and the shaft 2 are connected together in this manner, the distal ends of the expandable portions 31 are positioned at the proximal end of the expanded diameter portion 20, and the expandable portions 31 are not expanded. This state is hereinafter called a "first state".

A first recessed groove 35 away from the recess 34 is formed in the peripheral surface of the sleeve 3. A metal ring 4, which comes into contact with the inner peripheral wall of the mounting hole, is fitted in the first recessed groove 35.

Figure 2:
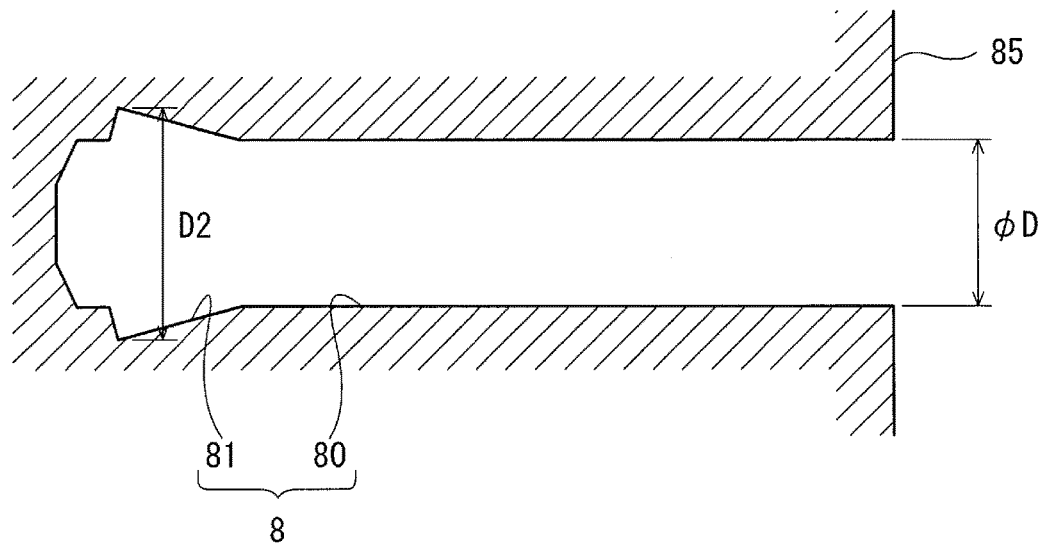
FIG. 2 is a sectional view of a mounting hole.

FIG. 2 is a sectional view of a mounting hole 8 drilled in a concrete wall surface 85. The mounting hole 8 includes: a thin hole portion 80, which is open at the wall surface 85; and an expanded diameter hole portion 81 formed at the back of the thin hole portion 80. The diameter D of the thin hole portion 80 is slightly greater than the maximum diameter of the expanded diameter portion 20 and the external diameter of the sleeve 3. Accordingly, when the sleeve 3 and the shaft 2 are connected together, the expanded diameter portion 20 and the sleeve 3 can be inserted into the thin hole portion 80.

The diameter D1 of the ring 4 is slightly greater than the diameter D of the thin hole portion 80. The shape of the expanded diameter hole portion 81 corresponds to the shape of the expanded diameter portion 20 of the shaft 2. The maximum diameter D2 of the expanded diameter hole portion 81 is substantially equal to a size that is obtained by adding the thickness of the expandable portion 31 to both sides of the maximum-diameter part of the expanded diameter portion 20. The shape of the mounting hole 8 is the same as that of a conventional mounting hole, and the method of forming the mounting hole 8 is well known. Therefore, descriptions of the shape of the mounting hole 8 and the mounting hole forming method are omitted herein.

Figure 3:
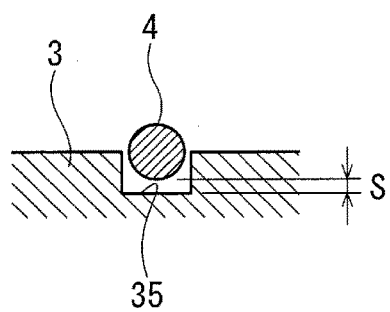
FIG. 3 is an enlarged sectional view of a ring and a first recessed groove.

FIG. 3 is an enlarged sectional view of the ring 4 and the first recessed groove 35. A gap S is formed between the inner periphery of the ring 4 and the bottom of the first recessed groove 35, and the ring 4 is elastically deformable inwardly by the gap S.

Mounting Anchor Bolt in Mounting Hole

The steps of assembling the anchor bolt 1 and mounting the anchor bolt 1 in the mounting hole 8 are as follows. First, the shaft 2 is inserted into the sleeve 3 until the distal ends of the expandable portions 31 are positioned at the proximal end of the expanded diameter portion 20 (i.e., until the first state is achieved). Then, the bottom of the recess 34 is hit to the inside, such that it bites into the peripheral surface of the shaft 2, and thereby the sleeve 3 and the shaft 2 are connected together. In this manner, the anchor bolt 1 is completed as shown in FIG. 4.

Figure 4:
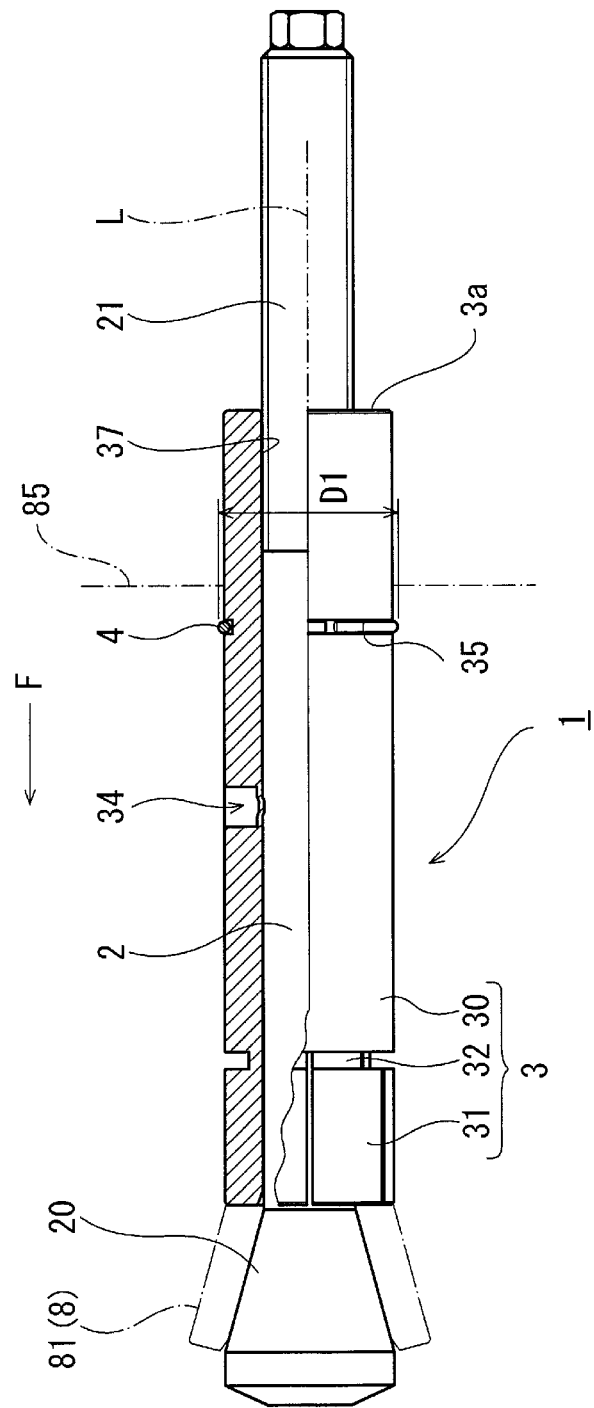
FIG. 4 shows a process of mounting the anchor bolt in the mounting hole.

Next, the anchor bolt 1 is inserted in an insertion direction F into the mounting hole 8, which is indicated by one-dot chain lines in FIG. 4. Since the diameter D1 of the ring 4 is slightly greater than the diameter D of the thin hole portion 80, the ring 4 is elastically deformed inwardly by the gap S at a maximum. The anchor bolt 1 is inserted against the friction exerted between the ring 4 and the inner peripheral wall of the thin hole portion 80. When the distal end face of the expanded diameter portion 20 comes into contact with the inner back surface of the expanded diameter hole portion 81, the shaft 2 cannot be inserted any more further, and thus the shaft 2 is in an insertion complete state.

Figure 5:
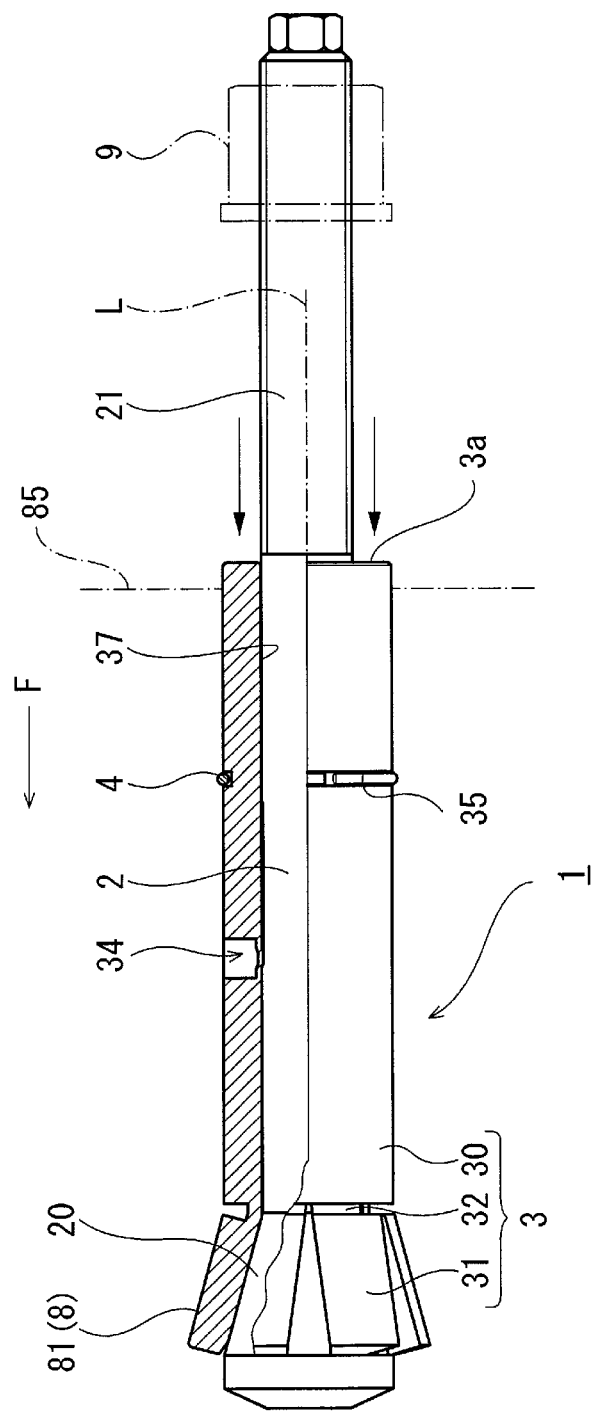
FIG. 5 shows a process of mounting the anchor bolt in the mounting hole.

Next, as shown in FIG. 5, an end face 3a of the sleeve 3 is hit by a hammer or the like (not shown) from the outside of the wall surface 85, and thereby only the sleeve 3 is pushed into the expanded diameter hole portion 81 in the insertion direction F. That is, the sleeve 3 is pushed into the expanded diameter hole portion 81 in a manner to disconnect the bottom of the recess 34 and the peripheral surface of the shaft 2 from each other. However, even after the bottom of the recess 34 and the peripheral surface of the shaft 2 are disconnected from each other, the bottom of the recess 34 and the peripheral surface of the shaft 2 are frictionally in contact with each other. Therefore, the shaft 2 and the sleeve 3 are still fixed in the rotation direction about the axis L.

The expandable portions 31 expand by bending outwardly along the outer peripheral surface of the expanded diameter portion 20 while the thin-wall connecting portion 32 serves as a supporting point for the expandable portions 31. This state is hereinafter called a "second state". As a result, the gap between the expanded diameter hole portion 81 and the expanded diameter portion 20 is filled by the expandable portions 31. Owing to the second state, the shaft 2 is prevented from coming out of the mounting hole 8, i.e., the anchor bolt 1 is prevented from coming out of the mounting hole 8. In this state, some component, structure, or the like (not shown) is fitted through the bolt 21 of the shaft 2, and then a nut 9 indicated by a one-dot chain line in FIG. 5 is fitted to the bolt 21 and rotated thereon. In this manner, the component, structure, or the like can be mounted on the concrete wall surface 85.

Since the ring 4 is in contact with the inner peripheral wall of the mounting hole 8, the friction force between the ring 4 and the inner peripheral wall prevents the sleeve 3 from rotating. The shaft 2, which is connected to the sleeve 3 owing to the friction force between the shaft 2 and the bottom of the recess 34, is also prevented from rotating about the axis L. Consequently, when the nut 9 is rotated, the shaft 2 and the sleeve 3 can be prevented from rotating together with the nut 9. Thus, unlike the conventional art, it is not necessary to hold the distal end of the bolt 21 with a wrench to prevent the rotation of the shaft 2. As a result, the work efficiency when tightening the nut 9 is improved.

Embodiment 2

The anchor bolt 1 according to Embodiment 1 is advantageous over the conventional art in terms of preventing the shaft 2 and the sleeve 3 from rotating together with the nut 9 when the nut 9 is rotated. However, due to variation in the external diameter of the ring 4, the friction force between the ring 4 and the inner peripheral wall of the mounting hole 8 is not constant. Specifically, if the friction force is great, the anchor bolt 1 cannot be easily inserted into the mounting hole 8, and there is a case where the anchor bolt 1 cannot be sufficiently inserted into the mounting hole 8 to bring the distal end face of the expanded diameter portion 20 into contact with the inner back surface of the expanded diameter hole portion 81. On the other hand, if the friction force is small, there is a risk that the anchor bolt 1 falls off the mounting hole 8 before the sleeve 3 is pushed into the expanded diameter hole portion 81. Particularly in a case where the concrete wall surface 85 is a ceiling wall surface, this risk is increased.

Moreover, although the sleeve 3 and the shaft 2 are connected together by utilizing the plastic deformation of the bottom of the recess 34, the connecting force between the sleeve 3 and the shaft 2 is not constant due to variation in the amount of the plastic deformation. If the connecting force is great, there is a risk that, when the sleeve 3 is pushed into the expanded diameter hole portion 81 in a manner to disconnect the sleeve 3 from the shaft 2, the sleeve 3 cannot be easily pushed in. The inventor of the present invention has come up with the idea of eliminating these problems by connecting the shaft 2 and the sleeve 3 together by a ring 4 made of synthetic resin.

Figure 6:
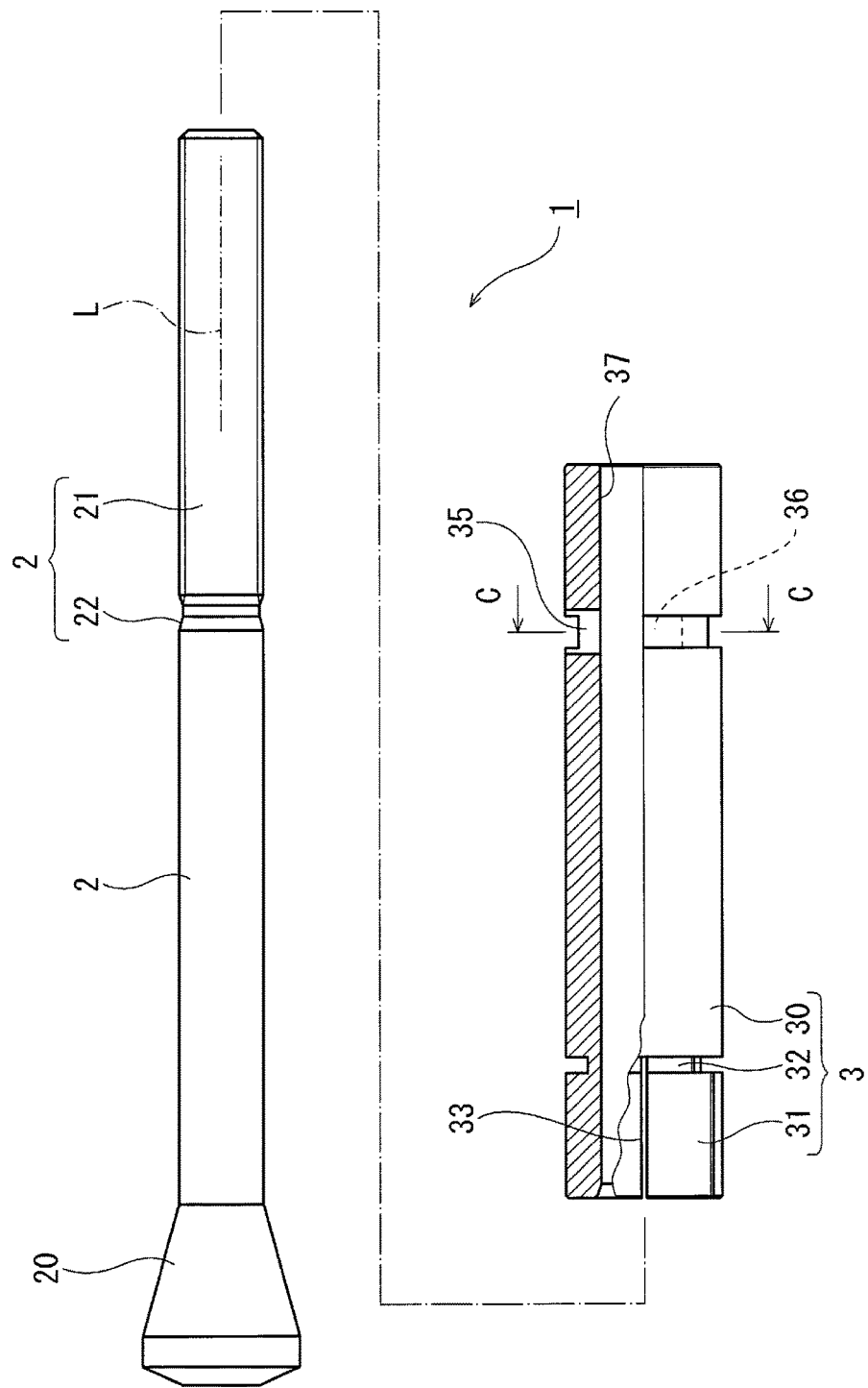
FIG. 6 is an exploded view of an anchor bolt according to another embodiment.
Figure 7:
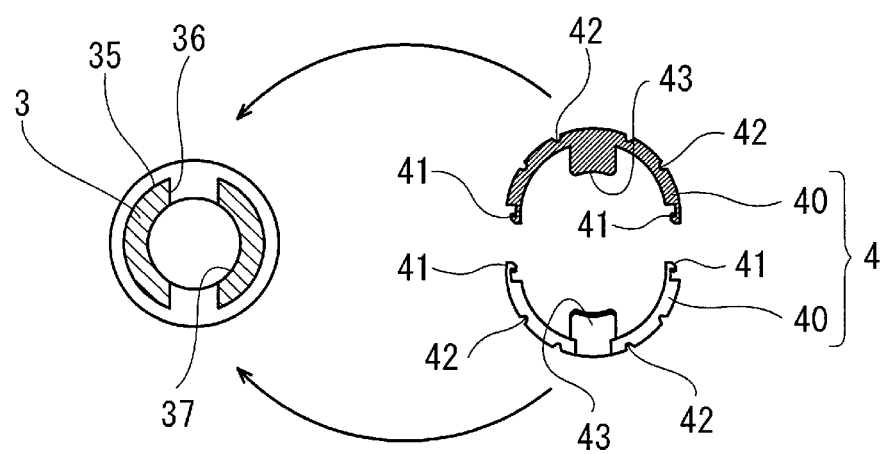
FIG. 7 shows a cutaway sectional view of a sleeve of FIG. 6, the view being taken along a plane including a line C-C of FIG. 6 as seen in the direction of the arrows of the line C-C, and also shows a ring.

FIG. 6 is an exploded view of the anchor bolt 1 according to the present embodiment. FIG. 7 shows a cutaway sectional view of the sleeve 3 of FIG. 6, the view being taken along a plane including a line C-C of FIG. 6 as seen in the direction of the arrows of the line C-C, and also shows the ring 4. The mounting hole 8, into which the anchor bolt 1 is to be inserted, is the same as the one shown in FIG. 2.

Similar to Embodiment 1, the anchor bolt 1 includes the shaft 2 and the sleeve 3. The shaft 2 includes the expanded diameter portion 20 formed on its distal end and the bolt 21 formed on its proximal end. The shaft 2 is inserted into the sleeve 3 from the proximal end side of the shaft 2. The sleeve 3 includes the expandable portions 31 provided at its distal end. The expandable portions 31 are configured to bend outwardly along the expanded diameter portion 20. As shown in FIG. 7, part of the first recessed groove 35 formed in the peripheral surface of the sleeve 3 is continuous with a through-hole 36, which reaches the hollow portion of the sleeve 3. A second recessed groove 22, which coincides with the through-hole 36 in the first state, is formed in the shaft 2.

In a state where the shaft 2 is inserted in the sleeve 3 such that the through-hole 36 coincides with the second recessed groove 22, the ring 4 is fitted into the first recessed groove 35 from the outside of the sleeve 3. In the present embodiment, the ring 4 includes two arc-shaped half ring bodies 40, and both the half ring bodies 40 are made of synthetic resin. Hooks 41 are provided on both ends of each of the half ring bodies 40. The hooks 41 of both the half ring bodies 40 are combined together, and thus the half ring bodies 40 form the ring 4. A plurality of recesses 42 away from each other are formed in the outer surface of each half ring body 40. The reason for this will be described below. The two half ring bodies 40 are fitted into the first recessed groove 35 from the opposite sides, such that the half ring bodies 40 sandwich the sleeve 3 and the hooks 41 facing each other are combined together. Since each of the half ring bodies 40 can be separately fitted into the first recessed groove 35, the work efficiency when forming the ring 4 on the sleeve 3 is improved.

As shown in FIG. 7, a fitting piece 43 projects inwardly from each half ring body 40 at its central portion in the lengthwise direction of the arc. In a state where the half ring bodies 40 are fitted in the first recessed groove 35, the fitting pieces 43 pass through the through-hole 36, and the distal ends of the fitting pieces 43 are fitted in the second recessed groove 22 of the shaft 2. In this manner, the shaft 2 and the sleeve 3 are detachably connected together. That is, the half ring bodies 40 and the ring 4 serve as the "connector" of the present invention.

Figure 8:
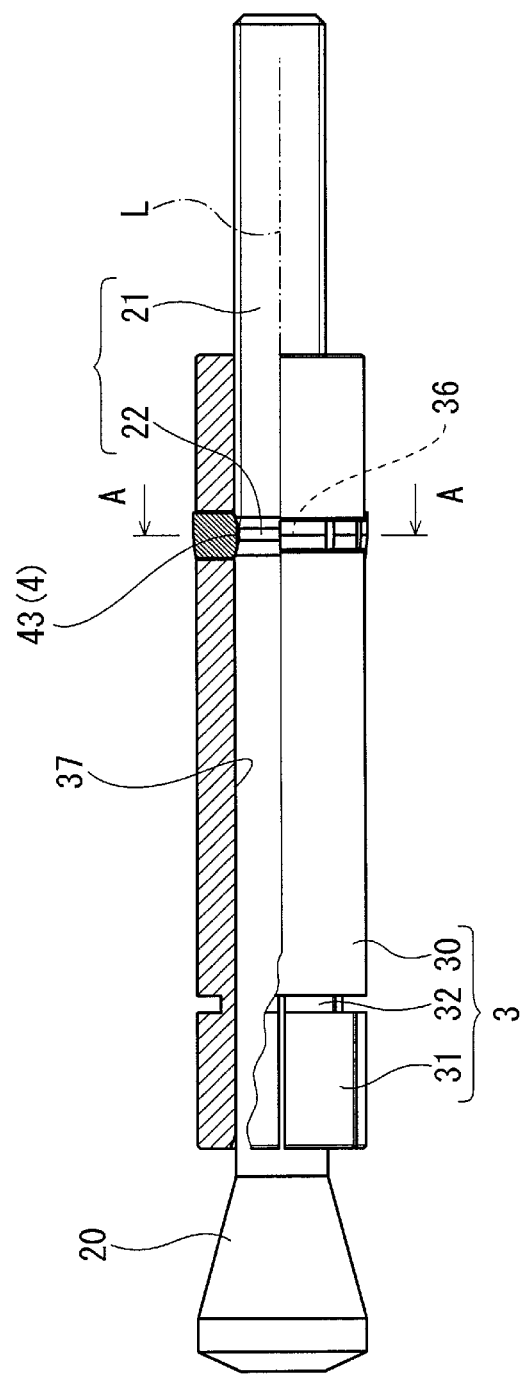
FIG. 8 is a partially cutaway sectional view of the anchor bolt in an assembled state.
Figure 9:
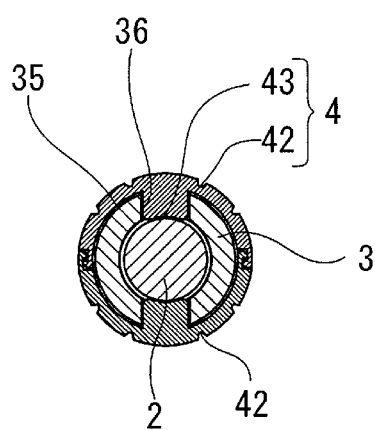
FIG. 9 shows a cutaway sectional view of the anchor bolt of FIG. 8, the view being taken along a plane including a line A-A of FIG. 8 as seen in the direction of the arrows of the line A-A.

FIG. 8 is a partially cutaway sectional view of the anchor bolt 1 in an assembled state according to the present embodiment. FIG. 9 shows a cutaway sectional view of the anchor bolt 1 of FIG. 8, the view being taken along a plane including a line A-A of FIG. 8 as seen in the direction of the arrows of the line A-A.

The steps of assembling the anchor bolt 1 are as follows. First, the shaft 2 is inserted into the sleeve 3 until the distal ends of the expandable portions 31 are positioned at the proximal end of the expanded diameter portion 20. As a result, as mentioned above, the through-hole 36 and the second recessed groove 22 coincide with each other (see FIG. 8). In this state, the two half ring bodies 40 are fitted into the first recessed groove 35 from the opposite sides with respect to the sleeve 3. As shown in FIG. 9, in a state where the half ring bodies 40 are fitted in the first recessed groove 35, the fitting pieces 43 pass through the through-hole 36, and the distal ends of the fitting pieces 43 are fitted in the second recessed groove 22 of the shaft 2. By locking the hooks 41 of the half ring bodies 40 together, the ring 4 is formed, and the shaft 2 and the sleeve 3 are detachably connected together. In this state, the external diameter of the ring 4 is slightly greater than the diameter D of the thin hole portion 80.

Figure 10A:
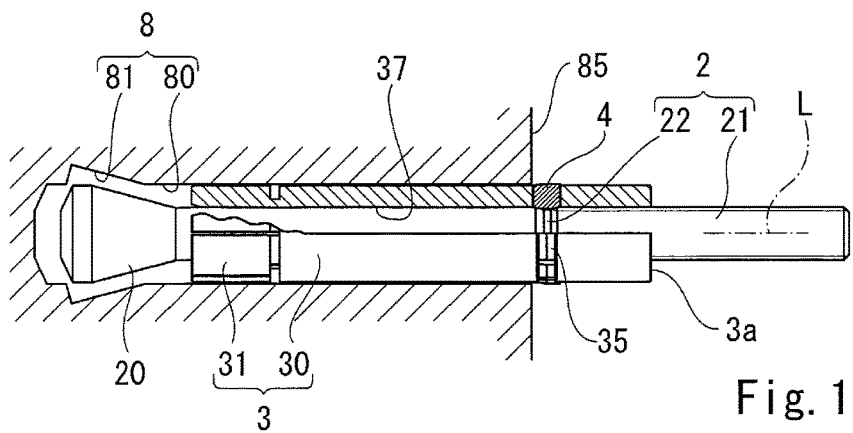
FIGS. 10A to 10D are sectional views showing the steps of inserting the anchor bolt into the mounting hole.
Figure 10B:
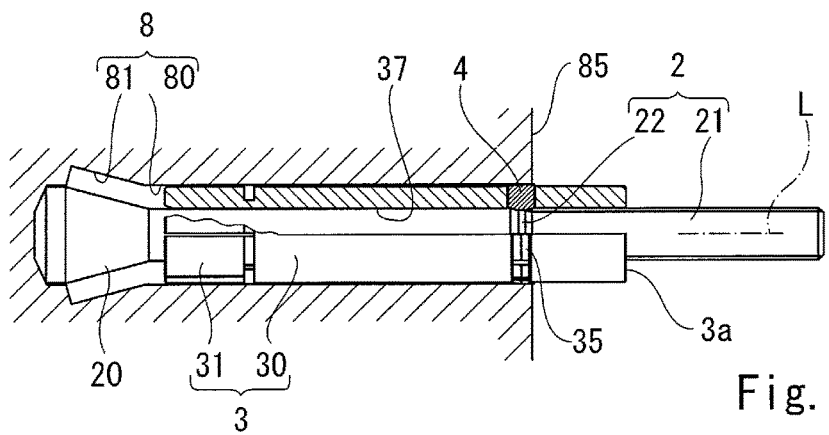

Next, the anchor bolt 1 is inserted into the mounting hole 8. FIGS. 10A to 10D are sectional views showing the steps of inserting the anchor bolt 1 into the mounting hole 8. As shown in FIG. 10A, since the external diameter of the ring 4 is slightly greater than the diameter D of the thin hole portion 80, the anchor bolt 1 is inserted into the mounting hole 8 against the friction exerted between the ring 4 and the inner wall of the thin hole portion 80. As shown in FIG. 10B, when the distal end face of the expanded diameter portion 20 of the shaft 2 comes into contact with the inner back surface of the expanded diameter hole portion 81, the shaft 2 cannot be inserted any more further, and thus the shaft 2 is in an insertion complete state.

Figure 10C:
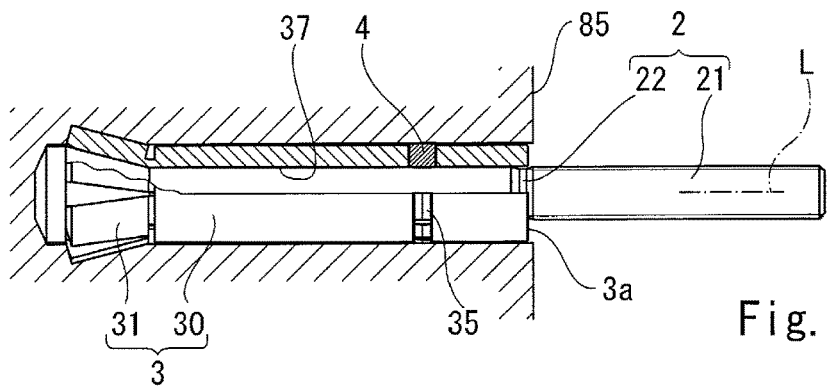
Figure 11:
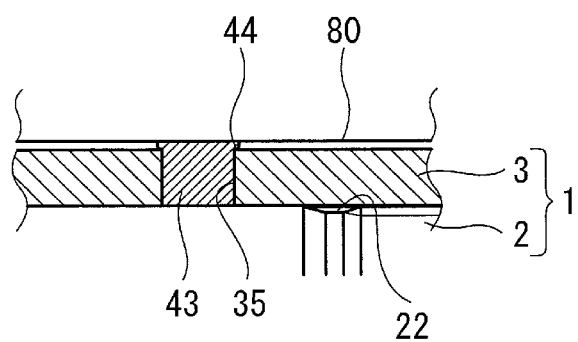
FIG. 11 shows bulging portions of a fitting piece in an enlarged manner.

Similar to Embodiment 1, in this state, as shown in FIG. 10C, the end face 3a of the sleeve 3 is hit by a hammer or the like (not shown) to push the sleeve 3 into the expanded diameter hole portion 81. Accordingly, the ring 4 fitted in the first recessed groove 35 is also pushed in together with the sleeve 3. As shown in FIG. 11 in an enlarged manner, the fitting pieces 43 are removed from the second recessed groove 22 and move onto the peripheral surface of the shaft 2. Since the fitting pieces 43 move onto the peripheral surface of the shaft 2, i.e., move in a manner to bulge outwardly, the fitting pieces 43 are partly sandwiched and deformed between the outer peripheral surface of the sleeve 3 and the inner peripheral wall of the mounting hole 8. The fitting pieces 43 thus deformed serve as bulging portions 44. The elastic force of the bulging portions 44 pushes the sleeve 3 to the shaft 2. That is, the bulging portions 44, which are deformed portions of the fitting pieces 43 fitted in the sleeve 3, fill the gap between the outer peripheral surface of the sleeve 3 and the inner peripheral wall of the mounting hole 8 and are frictionally in contact with the inner peripheral wall of the mounting hole 8. Here, the ring 4 is sandwiched and held between the inner peripheral wall of the mounting hole 8 and the peripheral surface of the shaft 2, i.e., in a tension rod-like state. As a result, rotation of the sleeve 3 relative to the mounting hole 8 and rotation of the shaft 2 about the axis L are prevented.

Figure 10D:
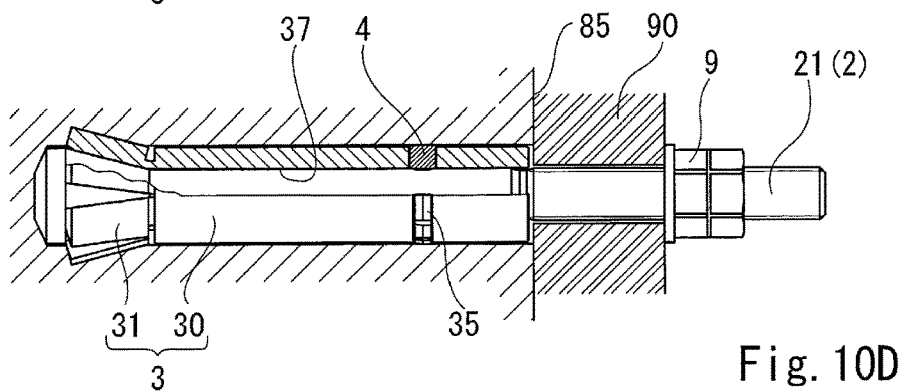

As shown in FIG. 10D, by fitting some component or a structure 90 through the bolt 21 of the shaft 2 and fitting the nut 9 to the bolt 21 and rotating the nut 9 thereon, the component or the structure 90 can be mounted on the concrete wall surface 85.

As described above, according to the anchor bolt 1 of the present embodiment, when the nut 9 is fitted to the shaft 2 and rotated thereon, the shaft 2 and the sleeve 3 can be prevented from rotating together with the nut 9. Therefore, unlike the conventional art, it is not necessary to hold the distal end of the bolt 21 with a wrench to prevent the rotation of the shaft 2. As a result, the work efficiency when tightening the nut 9 is improved. The applicant mainly assumes that the anchor bolt 1 is mounted in the mounting hole 8 formed in a ceiling wall, and the work efficiency is improved when performing the work of fitting the nut 9 to the bolt 21 of the anchor bolt 1 mounted on the ceiling wall and rotating the nut 9 on the bolt 21.

In the above description, the plurality of recesses 42 away from each other are formed in the outer surface of each of the half ring bodies 40. The reason for this is that the anchor bolt 1 is mainly assumed to be mounted on the concrete wall surface 85. As is well known, there are fine irregularities on the inner peripheral surface of the mounting hole 8 formed in the concrete wall surface 85. The recesses 42 of the half ring bodies 40 and the irregularities of the inner peripheral surface of the mounting hole 8 are fitted together. This consequently makes it possible to, as shown in FIG. 10B, prevent the anchor bolt 1 from falling off the mounting hole 8 more assuredly in the insertion complete state of the shaft 2. In particular, when mounting the anchor bolt 1 in the mounting hole 8 formed in a ceiling wall, the anchor bolt 1 can be advantageously prevented from falling off the mounting hole 8.

The present embodiment assumes that the anchor bolt 1 is mounted on the concrete wall surface 85. However, the anchor bolt 1 of the present embodiment can be mounted not only on the concrete wall surface 85, but also on a different wall surface.

In the above description, the first state is a state where the distal ends of the expandable portions 31 are positioned at the proximal end of the expanded diameter portion 20. However, the first state is not thus limited, but may be a different state, so long as the expandable portions 31 are in an unexpanded state. The first state may be a state where the distal ends of the expandable portions 31 are located at a position that is slightly shifted from the proximal end of the expanded diameter portion 20 in a direction reverse to the insertion direction.

Moreover, the ring may be tubular or cylindrical, and may be formed integrally.

Other Matters

The present invention is useful when applied to an anchor bolt that is to be fixed in a mounting hole formed in a concrete wall or the like.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

REFERENCE SIGNS LIST 1 anchor bolt
2 shaft
3 sleeve
4 ring
8 mounting hole
9 nut
20 expanded diameter portion
22 second recessed groove
31 expandable portion
35 first recessed groove
43 fitting piece

What is claimed is:

1. An anchor bolt to be inserted in a mounting hole formed in a wall surface, the anchor bolt comprising:
    a shaft elongated and extending along its axis, the shaft including an expanded diameter portion formed on its distal end and a bolt formed on its proximal end, the expanded diameter portion having a tapered outer peripheral surface that expands outwardly when seen in an insertion direction into the mounting hole; and
    a hollow sleeve that covers and is in contact with an outer peripheral surface of the shaft, the sleeve including an expandable portion formed at its distal end, the expandable portion being configured to bend outwardly to be in an expanded state, wherein
    a state where the sleeve covers the shaft such that the expandable portion is in an unexpanded state is a first state of the shaft and the sleeve,
    when the sleeve is further pushed into the mounting hole in the insertion direction from a state where the shaft and the sleeve in the first state are inserted in the mounting hole such that the distal end of the shaft is in contact with a bottom of the mounting hole, the expandable portion bends outwardly along the expanded diameter portion to be in the expanded state,
    a first recessed groove is formed in an outer peripheral surface of the sleeve,
    a ring that comes into contact with an inner peripheral wall of the mounting hole is fitted in the first recessed groove,
    a through-hole that allows the first recessed groove and a hollow portion of the sleeve to be in communication with each other is formed in the sleeve,
    a second recessed groove is formed in the outer peripheral surface of the shaft at a position that corresponds to a position of the through-hole in the first state,
    a fitting piece is formed on the ring, the fitting piece extending such that the fitting piece passes through the through-hole to reach the second recessed groove in the first state, and
    the fitting piece serves as a connector that connects the shaft and the sleeve in the first state.

2. The anchor bolt according to claim 1, wherein the ring is made of an elastic material, and
    when the sleeve is further pushed into the mounting hole in the insertion direction from the state where the shaft and the sleeve in the first state are inserted in the mounting hole such that the distal end of the shaft is in contact with the bottom of the mounting hole, the fitting piece is pushed out of the second recessed groove such that the ring is elastically deformed in a manner to bulge outwardly.

3. The anchor bolt according to claim 2, wherein a plurality of recesses arranged in a circumferential direction are formed in an outer peripheral surface of the ring.

4. The anchor bolt according to claim 2, wherein the ring includes two arc-shaped half ring bodies.

5. The anchor bolt according to claim 1, wherein a plurality of recesses arranged in a circumferential direction are formed in an outer peripheral surface of the ring.

6. The anchor bolt according to claim 1, wherein the ring includes two arc-shaped half ring bodies.

7. The anchor bolt according to claim 1, wherein the ring includes two arc-shaped half ring bodies and a plurality of recesses arranged in a circumferential direction are formed in an outer peripheral surface of the ring.

8. The anchor bolt according to claim 1, wherein the ring is made of elastic material and includes two arc-shaped half ring bodies and a plurality of recesses arranged in a circumferential direction are formed in an outer peripheral surface of the ring; and,
    when the sleeve is further pushed into the mounting hole in the insertion direction from the state where the shaft and the sleeve in the first state are inserted in the mounting hole such that the distal end of the shaft is in contact with the bottom of the mounting hole, the fitting piece is pushed out of the second recessed groove such that the ring is elastically deformed in a manner to bulge outwardly.

* * * * *